United States Patent [19]

Richards et al.

[11] 3,838,972

[45] Oct. 1, 1974

[54] METHOD AND APPARATUS FOR SULFURIC ACID AEROSOL ANALYSIS

[75] Inventors: Lorenzo Willard Richards, Carlisle; Peter S. Mudgett, Forge Village, both of Mass.

[73] Assignee: Cabot Corporation, Boston, Mass.

[22] Filed: Apr. 27, 1973

[21] Appl. No.: 354,929

[52] U.S. Cl. ........... 23/232 R, 23/232 E, 23/254 R, 23/254 E
[51] Int. Cl. .......................................... G01n 21/58
[58] Field of Search ........ 23/230 PC, 231 R, 232 E, 23/254 E, 254 R

[56] References Cited
UNITED STATES PATENTS
3,692,481  9/1972  Mitchell .................. 23/230 PC

OTHER PUBLICATIONS

Scaringelli et al., "Determinations of Atmospheric Concentrations of Sulfuric Acid Aerosol by Spectrophotometry, Coulometry, and Flame Photometry," Analytical Chem. Vol. 41, 1969, pp. 707-713.

Primary Examiner—R. E. Serwin
Attorney, Agent, or Firm—Kenneth W. Brown; Barry R. Blaker; Lawrence A. Chaletsky

[57] ABSTRACT

Method and apparatus for the specific and quantitative analysis of gas streams containing sulfuric acid in aerosol form. The invention is particularly adapted for use in monitoring the sulfuric acid aerosol content of polluted air masses.

22 Claims, 2 Drawing Figures

METHOD AND APPARATUS FOR SULFURIC ACID AEROSOL ANALYSIS

The Invention described herein was made in the course of, or under, a contract with the Department of Health, Education, and Welfare.

FIELD OF THE INVENTION

The present invention relates broadly to quantitative chemical analytical methods and apparatuses and is more particularly concerned with method and apparatus for the determination of sulfuric acid aerosol concentration in gases. Even more particularly, the present invention relates to environmental analysis and is concerned with method and apparatus for the quantitative measurement of sulfuric acid aerosols in polluted air masses.

In recent years ever increasing attention and interest has been focussed on identifications and quantitative analyses of specific atmospheric pollutants. Generally speaking, atmospheric pollutants can be categorized as belonging to one of two physical forms: (1) gases or (2) particulates in liquid or solid form. Sulfuric acid is one species of important pollutant known to often exist in a polluted atmosphere in aerosol form. A major source of such sulfuric acid aerosols is generally held to reside in the multitude of combustion reactions carried out by mankind involving sulfur bearing fuels. While the principal sulfurous oxidation product of these reactions is sulfur dioxide, a substantial sulfurous by-product is sulfur trioxide which reacts with moisture in the atmosphere to form sulfuric acid aerosols. Further significant amounts of sulfuric acid are further thought to result when hydrogen sulfide and sulfur dioxide are subjected to photochemical oxidations in the atmosphere. Again, the resulting sulfur trioxide product is converted to sulfuric acid aerosol by contact with atmospheric moisture. In any case, such sulfuric acid aerosol pollutants are believed to have contributed to highly morbid pollution disasters which have occurred in fogs and/or smogs encountered in London, Meuse Valley, Donora and New York. Accordingly, it is apparent there exists a need for a suitable method and apparatus by which concentrations of sulfuric acid aerosols in air masses can be determined rapidly and accurately.

Unfortunately, it has heretofore been the general experience that where sulfuric acid aerosol pollution exists there also almost invariably exists other sulfurous and/or acidic species of air pollution which can mask or severely confuse conventional rapid analytical techniques. For instance, it has been proposed to filter a sample of a polluted air mass, such as by means of a porous filter or one or more liquid traps, thereby to collect the particulate pollutants while allowing gaseous components of the sample air mass to pass through. The collected particulate fraction of the polluted sample is then subjected to various of conventional acid-base, sulfate ion or conductance analyses, the results of which analyses are presumed to be indicative of the sulfuric acid concentration of the filtered sample. However, in real life air pollution situations there often exist substantial quantities of ionic, sulfurous, acid or acid reacting pollutant substances other than sulfuric acid aerosols. Among the more common co-pollutants are such substances as $NO_2$, $SO_3$, $HNO_3$, $HCl$, $SO_2$, $H_2S$, ammonium sulphate, cuprous sulfate and the like. Thus, quantitative chemical analyses based on acid-base or sulfate ion reactions or based on conductance methods cannot normally be expected to segregate out such co-adulterants from a polluted air mass and thus be specific for sulfuric acid.

In another embodiment of the general analytical approach outlined above, co-workers F. P. Scaringelli and K. A. Rehme have further proposed to volatilize the sulfuric acid aerosol collected as a result of the filtration of the air sample by eating to above the boiling point of sulfuric acid (ca. 330°C at 98 percent concentration). The resulting acid vapors are then passed into a suitable apparatus adapted to quantitatively analyze for sulfur, such as a flame photometric detector (Determination of Atmospheric Concentrations of Sulfuric Acid Aerosol by Spectrophotometry, Coulometry and Flame photometry, *Analytical Chemistry*, 41, 1969, pages 707-713). The underlying theory of this proposal resides in the assumption that the only volatilizable sulfur-containing compound on the filter will be sulfuric acid. Accordingly, when the total sulfur content becomes known, it would then be possible to calculate the amount of sulfuric acid collected based on the above assumption. Again, however, this proposal suffers from the problem that the particulate and/or aerosol fractions of the collected sample often contain significant quantities of adulterating and volatilizable sulfur-containing compounds in addition to the sulfuric acid. Said compounds, on heating, can volatilize or decompose and pass through with the sulfuric acid into the analytical apparatus. Thus, common sulfur bearing particulate pollutants such as ammonium sulfate and cuprous sulfate, which have decomposition temperatures of as low as about 250°C, thus tend to decompose into volatile sulfur by-products which then flow along with the volatilized sulfuric acid into the sulfur analyzing apparatus. Obviously, the sulfur analyzing apparatus, not being specific to sulfuric acid, can determine only the total sulfur content of the heated and volatilized sample and thus often provides completely erroneous data relative to sulfuric acid concentration of the sampled gas.

In accordance with the present invention, however, the problem of quantitatively analyzing sulfuric acid concentrations in polluted air masses comprising other commonly encountered sulfur bearing pollutants has been substantially overcome.

OBJECTS OF THE INVENTION

It is a principal object of the present invention to provide a novel method for the quantitative analysis of sulfuric acid contained in aerosol form in a gas.

It is another object of the present invention to provide a novel method for the quantitative analysis of sulfuric acid contained in aerosol form in a polluted air sample without deleterious interference from other acidic or sulfur bearing pollutants.

It is yet another object of the invention to provide a novel method for monitoring the sulfuric acid concentration of ambient air masses.

It is still another object of the invention to provide novel apparatus for the quantitative analysis of sulfuric acid contained in aerosol form in gases.

It is another object of the invention to provide novel apparatus for the quantitative analysis of sulfuric acid in aerosol form in a polluted air mass wherein interference due to other acidic or sulfur bearing pollutants in said air mass is largely avoided.

Other objects and advantages of the invention will in part be obvious and will in part appear hereinafter.

GENERAL DESCRIPTION OF THE INVENTION

In accordance with the present invention, the sulfuric acid content of a gas containing sulfuric acid aerosol is determined without substantial interference from other sulfur-bearing or acidic contaminents by:

1. conducting a known volume of a sample gas through a porous inlet filter media adapted to collect thereon the sulfuric acid aerosol components of the sample while allowing gaseous components thereof to pass therethrough;
2. volatilizing the sulfuric acid aerosol collected on said filter medium by passing a dry inert purge gas stream through said filter at a temperature of less than about 250°C, thereby to volatilize said sulfuric acid without volatilization or decomposition of other sulfur bearing materials collected on the filter; and
3. determining the sulfur content of the purge gas stream containing the sulfuric acid vapors therein by means of flame photometric analysis.

THE DRAWINGS

FIG. 1 forming part hereof is a diagrammatic, schematic flow sheet disclosing various basic and preferred elements of the process and apparatus of the invention.

FIG. 2 is a cross-sectional view of a preferred filter holder employed in the apparatus of the invention.

DETAILED DESCRIPTION OF THE INVENTION

Figure 1:
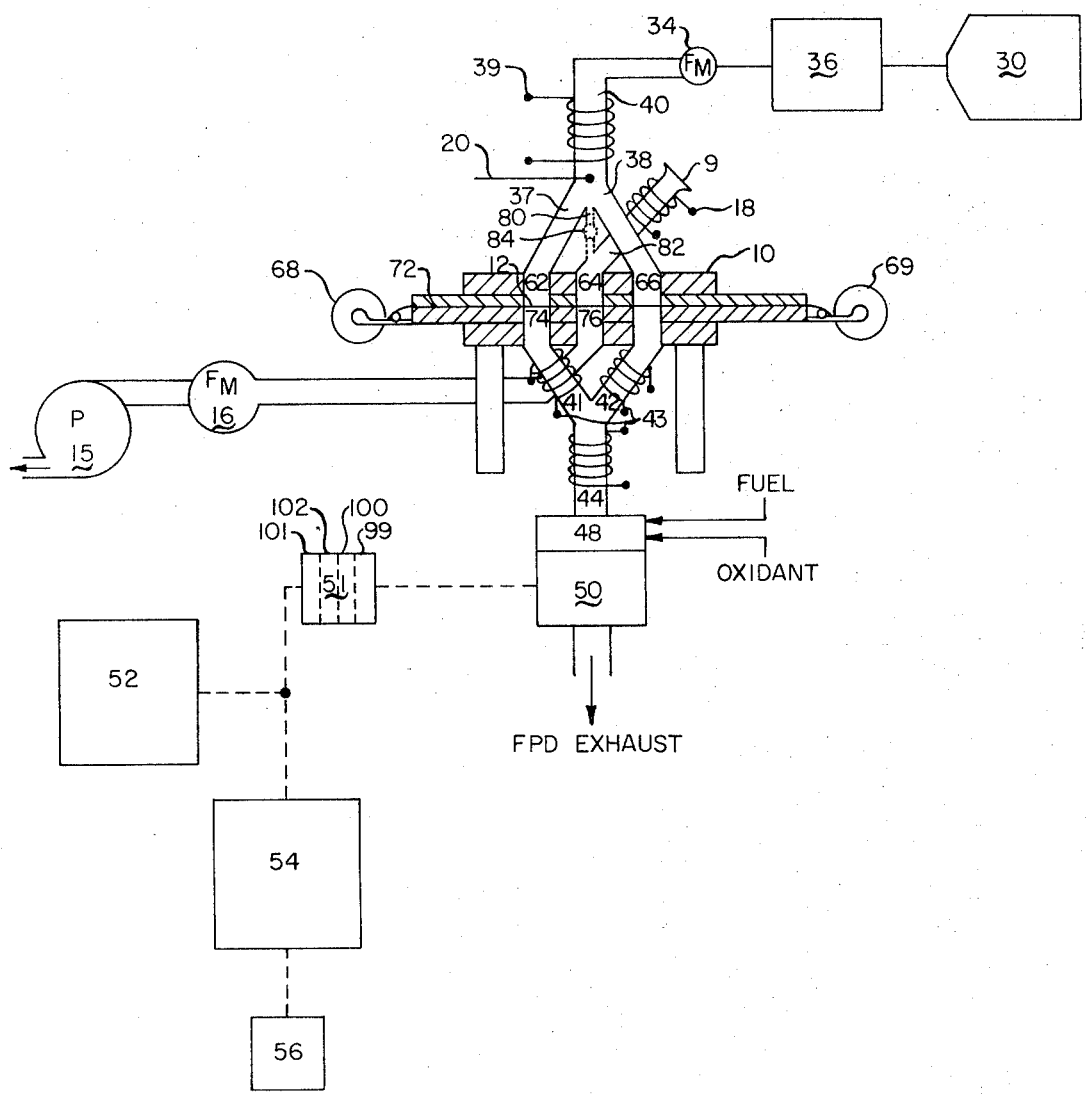
Figure 2:
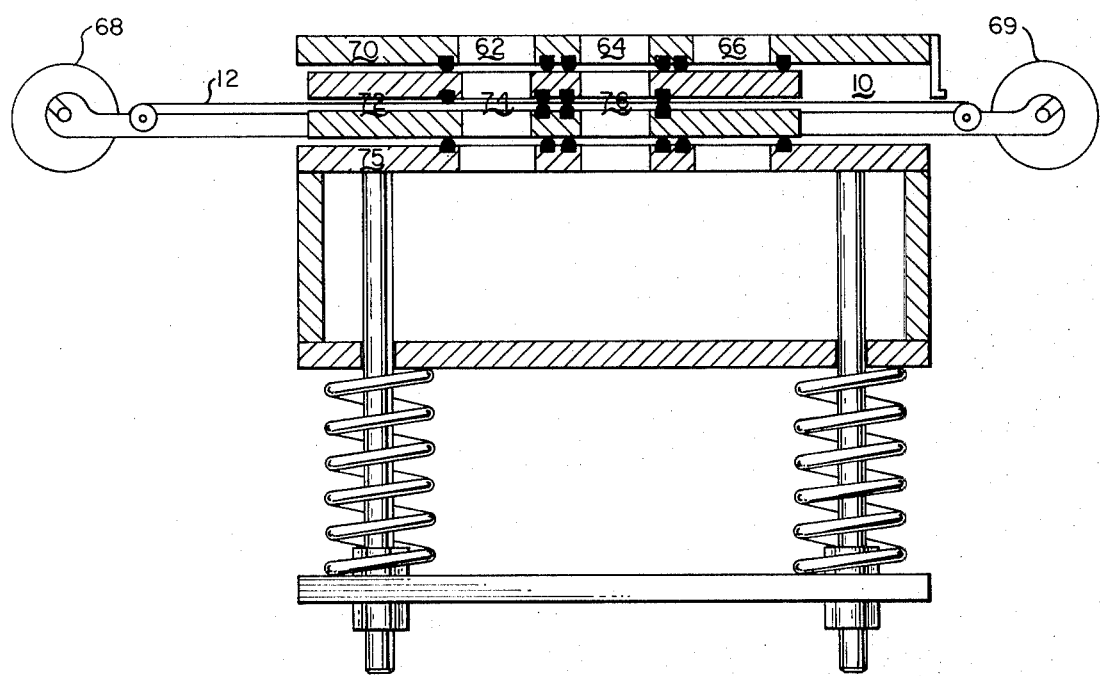

Referring now to FIGS. 1 and 2 wherein like reference numerals refer to like elements, the apparatus of the invention broadly comprises filter holder 10 which carries therein a porous filter element 12. Said element 12 is adapted to filter out aerosol particles contained in a gas stream passing therethrough, thereby to collect thereon sulfuric acid aerosol particles entrained in said gas stream. The sample gas stream is drawn into intake 9 and through sampling aperture 64 of filter holder 10 by the action of pump 15. The rate at which said sample gas stream is drawn through the portion of the filter element 12 positioned over aperture 64 can be monitored and/or controlled by means of a suitable flow meter or mass flow meter 16. In this context it is important to note that the volume of sample gas drawn through the filter element 12 should be precisely controlled or at least accurately determined in order that the concentration of sulfuric acid contained therein be properly calculated. The flow rate or volume throughput of the sample gas through the filter can thus be controlled in response to the suspected quantity of sulfuric acid aerosol contained therein.

Obviously, the porous filter element 12 should be inert with respect to sulfuric acid and should further be inert with respect to other sulfur bearing pollutants which may form part of the sample gas stream. Due attention to this feature of filter element inertness will avoid accidental reactions in which additional sulfuric acid or other volatilizable sulfur compounds can be produced. Accordingly, such porous filter media as glass, polytetrafluoroethylene or polyfluorochloroethylene or fluorinated ethylene-propylene resin fibers; sintered ceramics and the like are all generally suitable for use as the filter element 12 of the present apparatus. Moreover, it should be noted that the term "porous" as employed within the context of the present specification and claims includes within its ambit those filter materials which are more appropriately termed "membranous" from the standpoint of physical form but which membranous materials nevertheless serve the critical function of allowing gaseous components of the sample gas stream to pass therethrough while collecting substantially all of the sulfuric acid aerosol particles thereon.

Under certain conditions, the sample gas stream is advantageously mildly heated to above ambient temperature and below about 100°C prior to contact thereof with the porous filter medium. Accordingly, sample gas intake 9 can be equipped with a heater 18, which may conveniently be of an electrical resistance type. Alternatively, provision for the heating of the sample gas stream may be effectuated by injecting a relatively small quantity of heated dry purge gas into the sample gas stream. Specific apparatus for accomplished this last-mentioned sample gas preheating step is shown in FIG. 1 in dotted line format, whereby an additional by-pass conduit 80 communicates purge gas conduit 40 with samplee air inlet conduit 82. Said conduit 80 is provided with suitable valve means 84 whereby the rate of flow of said purge gas into the sample gas stream is controlled. Alternatively, of course, a completely separate metered source of heated purge gas can be employed.

It should be noted and understood that the principal purpose served by heating of the sample gas stream is to reduce and/or maintain the water content thereof at below 100 percent relative humidity. Where the ambient sample gas stream relative humidity is already below about 100 percent, of course, the sample gas heating step may be entirely avoided. As mentioned, the heating of the sample gas stream is intended principally to maintain the relative humidity thereof at a maximum of about 100 percent or, preferably, at least somewhat less. This is in response to the knowledge that several of the known serious sulfuric acid aerosol pollution incidents occurred under relatively severe smog or fog conditions. Thus, the polluted air during the course of these pollution events was often saturated with water. Under these conditions, it would, of course, be possible to deleteriously affect the sulfuric acid aerosol collection efficiency of the filter element 12 by water condensation and/or direct interfering impingement thereon of water from such smogs or fogs if suitable provisions are not provided by which to maintain the filter element 12 at above the dewpoint of the water. Said provision is conveniently afforded by the mild heating of the incoming sample gas stream as described hereinbefore. An additional advantage afforded by the relatively mild heating of the sample gas stream (and the relative dryness of the sulfuric acid collected) resides in a normally faster response of the analyzing apparatus. Apparently, the dry inert purge gas stream employed to volatilize the sulfuric acid subsequent to collection of the sulfuric acid aerosol on the filter element 12 is rendered more efficient, since said dry gas stream is not required to also remove water from the filter element 12 in competition with its principal purpose of volatilization of the collected sulfuric aerosol. Accordingly, the employment of the feature of preheating of the sample gas is recommended at any time when the ambient sample gas stream is known or suspected of having a relative humidity ($H_2O$) of greater than about 100 percent or when visible moisture is present.

The dry inert purge gas stream is supplied to either of purge gas inlet apertures 62 or 66 of filter holder 10 from a source 30 such as a pressurized cylinder/regulator combination. The rate of flow thereof can be controlled by means such as a flow meter 34. The precise rate of flow to be employed for any given situation is subject to variation. Suffice it to say, therefore, that suitable purge gas flow rates result when said rate is sufficiently low as to avoid overloading the downstream flame photometric detector and sufficiently high as to avoid excessive cycle times in effectuating substantially complete sulfuric acid purging of the filter element. Accordingly, the precise flow rate of the inert purge gas to be employed under any given circumstances can be determined in practice. Desirably, the dry inert purge gas stream is caused to flow through a bed of desiccant material 36, such as molecular sieves or $P_2O_5$, prior to its entry into filter holder 10 through bifurcated conduits 37 and 38. Also, it is normally advantageous to provide means to heat the inert purge gas stream prior to its contact with filter element 12. Accordingly, a purge gas inlet heater 39 is preferably supplied about common supply conduit 30 and can conveniently be of similar construction to that of sample gas stream heater 18. Control of the heating of the purge gas stream can also be advantageously effected by means of a feedback circuit in operation communication with thermocouple 20. Also, since the rate of volatilization of the sulfuric acid aerosol can be markedly altered by the temperature of the purge gas stream, control of said purge gas temperature can also be achieved by a suitable feedback circuit interposed between the FPD output/signal processing portion of the system and the energy input control for heater 39. For instance, said feedback circuit can be placed between the amplifier 51 and a servo-control unit (not shown) which operates a variable resistor serving the power input into heater 39. In this manner, the FPD signal continuously monitors itself and, when said signal approaches overloading of the FPD, the servo-unit will respond by decreasing the energy input into heater 39, thereby to lower the temperature of the purge gas stream and thus to reduce the rate of vaporization of the sulfuric acid aerosol from filter 12.

Employing the preferred filter holder 10 of the invention, the inert dry purge gas stream flows through only one of inlets 62 and 66 during each cycle, the one or the other remaining inlet being closed off by shutter plate 72 of filter holder 10. The operations and further apparatus details of said preferred filter holder 10 will be discussed in greater detail hereinafter. In any case, the purge gas flows through the exposed portion of filter element 12, the corresponding bifurcated outlet conduit 41 or 42, common outlet line 44, and into burner block 48 of a flame photometric detector 50. Desirably, the supply outlet conduit(s) leading to the FPD will be heated, such as by heaters 43, to a temperature sufficient to prevent condensation of the sulfuric acid vapors onto the surfaces thereof. Having already been separated from any particulate sulfurous contaminants which have decomposition or volatilization temperatures of above 250°C, the purge gas efflux from filter 12 can thus be heated to and maintained at substantially above 250°C, e.g., 340°C, with little or no danger of sulfur contamination to this source.

Broadly, any flame photometric detector (hereinafter FPD) which is sensitively responsive to the presence of sulfur can be employed in the apparatus of the invention. Basically, flame photometry involves spectrochemical analysis of elements by excitation of the element to the luminescent state in a flame. The exciting flame is generally fueled by hydrogen and, in the present invention, the preferred fuel is hydrogen. For purposes of the present invention, of course, the element under analysis is sulfur which is conveyed from the filter element 12 to the flame in the form of vaporized sulfuric acid. Within the FPD flame the sulfuric acid is dissociated and the sulfur content thereof optically excited in the flame, thereby creating specific narrow spectral bands characteristic of sulfur and the intensities of which bands may be measured by means of optical analyzers such as monochromators or photomultiplier tubes. The measured spectral band intensities are indicative of the amount of the element charged into the flame. FPDs of the type disclosed and claimed in U.S. Pat. No. 3,489,498, Jan. 13, 1970, Brody et al., the entire disclosure of which is incorporated herein by reference, have been found to be well suited for use in the apparatus of the present invention. Such FPDs are commercially available through TRACOR, Inc., Dallas, Texas and are sold under the trade designation, Meloy Model No. FPD-100-AT. This FPD comprises a hydrogen/oxygen burner apparatus into which the sulfur containing sample is injected. A photomultiplier tube scans a precise portion of the flame with the aid of an optical filter which transmits only a narrow spectral bandwidth at about 3,930 A, which bandwidth is a prominent sulfur spectral emission band.

The intensity of a sulfur spectral band emission sensed by an FPD analyzer results in an electrical signal output from the FPD, the intensity of said signal being responsive to the concentration of excited $S_2$ molecules existing in the flame at any given instant. Accordingly, FPD signal output processing may be conveniently achieved by injection of the FPD 50 output signal into an amplifier 51, such as an electrometer 99 equipped with a bucking current circuit (for purposes of subtraction of the no sulfur baseline signal from the total output signal), and the thusly amplified signal thence injected into a strip chart recorder 52. Said recorder 52, which is driven at a constant speed, therefore logs the intensity of the FPD 50 sulfur emission signal as a function of time. However, since the FPD signal output is not a linear function with respect to the concentration of sulfuric acid vapors injected thereinto, meaningful information is provided by employment of suitable linearizing circuitry which may conveniently form part of the overall amplification circuitry 51. Thus, upon initial amplification of signal as by electrometer 99, the amplified signal is injected into a logarithmic amplifier 100, attenuator 102 and antilogarithmic amplifier 101, thereby to be linearized. Under these conditions, the area under the charted curve is thus representative of the total quantity of sulfur flowing through the FPD during the course of the filter element 12 purge cycle. Thus, since all sulfur bearing compounds other than the sulfuric acid are either passed through the filter 12 as gases during the collection cycle or remain on the filter due to the low temperature under which the purge gas volatilization of the sulfuric acid is achieved (e.g., cuprous sulfate and ammonium sulfate), the only sulfurous compound injected into the FPD is sulfuric acid.

Accordingly, in the practice of the present invention, the total sulfur content determined by the FPD analysis is truly representative of the sulfuric acid aerosol collected on the filter element 12. From the recorder trace, therefore, the amount of sulfuric acid contained in a known volume of sample gas flowed through the filter element 12 can thus be determined by comparison thereof against calibration curves previously derived by injection of known quantities of sulfuric acid aerosol into the system. If desired, however, the amplified signal from the amplifier 51 can be injected into an integrator 54 which, by conventional and known circuitry, can provide continuous summation of the data of the signal being traced by chart recorder 52 and can be further adapted to provide a direct digital readout 56 of the concentration of sulfuric acid contained in the known volume of sample gas.

Substantially any dry gas comprising less than about 1,000 p.p.m. by volume of water can be employed for purposes of volatilization of the sulfuric acid aerosol collected on filter element 12, provided, of course, that said gas is inert with respect to the collected sulfuric acid sample and does not itself bear characteristic spectral emission bands or lines which would interfere with the sulfur detection by the FPD. Thus, nitrogen, argon, xenon, carbon dioxide and the like are all generally suitable. Advantageously, the inert dry purge gas employed will have a water content of less than about 10 p.p.m., by volume. We have found that dry air, essentially free from sulfur bearing contaminants, is normally entirely satisfactory for purposes of volatilizing the sulfuric acid sample and conveying the vaporized acid into the FPD. Where air is utilized, however, the oxygen content thereof, and more specifically the rate of oxygen resulting from the flow thereof, should be fully taken into account for purposes of providing a suitable flame in the FPD. This consideration can be important in the operations of the preferred FPDs employed in the present invention since a critical element of the operations thereof as disclosed in U.S. Pat. No. 3,489,498 resides in the provision of a hydrogen-rich or reducing flame.

A typical operational cycle of the apparatus of the invention is now described with reference to FIG. 1 and with especial reference to FIG. 2 wherein there is provided a more detailed view of a preferred embodiment of filter holder 10. Inlet plate 70 comprises equally spaced apart inlet apertures 62, 64 and 66, respectively. As will be noted, central aperture 64 constitutes the sole sample gas stream inlet, apertures 62 and 66 being reserved entirely as stations through which the sulfuric acid aerosol collected in the preceding collection cycle is volatilized by passage of the dry purge gas stream therethrough. Filter element 12 is in strip form and is supplied from supply spool 68 and removed on takeup spool 69. The strip form filter element 12 is conducted through a slidable split shutter plate 72 having two apertures 74 and 76 adapted to be coextensive with sample gas stream inlet aperture 64 and one or the other of purge gas inlet apertures 62 or 66. The respective supply and takeup reels 68 and 69 are mounted out-board of the respective ends of the split shutter plate 72. Thus, by sliding the shutter plate 72 from the position shown (wherein purge gas inlet aperture 62 is aligned with aperture 74 of the split shutter plate 72 and wherein the sample gas stream inlet aperture 64 of the intake plate 70 is aligned with aperture 76 of said split shutter plate 72), there results a shift of stations of filter element 12. In the new position, the portion of the filter element 12 circumscribed by aperture 76 is shunted to the purge gas station located under purge gas inlet aperture 66 whilst the freshly purged portion of the filter element 12 encompassed by aperture 74 is re-exposed beneath the sample gas stream inlet aperture 64. Exhaust plate 75 is essentially duplicative of intake plate 70 and its three spaced apart apertures are fixedly located as to be coextensive with the corresponding apertures of inlet plate 70. Gas seals, such as O-rings, are provided between the respective plate members 70, 72 and 75 of the construction and between the strip filter element 12 and the contacting surfaces of split shutter plate 72. Means are provided, such as compression springs 80, for biasing the exhaust plate 75 towards intake plate 70, thereby to compress the system and to complete the requisite gas seals. Upon repositioning of fresh filter element 12 in apertures 74 and 76, the biasing force are removed from the respective plates, thus allowing freedom of movement of the strip filter element 12 with respect to the split shutter plate 72.

In operations, then, a sample gas is inducted through inlet 9 and flows through that portion of filter element 12 positioned under inlet plate aperture 64. The filtered gas stream then passes into pump 15 and is exhausted to the atmosphere or, if desired, flushed before or after flowing through the pump into suitable traps for removing whatever noxious materials may remain therein. By virtue of the action of flow meter 16, the volume of sample gas stream caused to flow through the filter element 12 will be a known quantity. When the desired volume of sample gas stream has been filtered and the sulfuric acid aerosol content thereof collected on the filter element 12, the position of that portion of filter element 12 exposed under aperture 64 of intake plate 70 is shunted by sliding split shutter plate 72 to the other of its two positions. As mentioned, when the gas stream is sampled through that portion of filter element 12 circumscribed by aperture 76 of split shutter plate 72, the changeover of the shutter plate to said other position will result in stationing of aperture 76 under purge gas inlet aperture 66 of intake plate 70.

During the purging of the sulfuric acid from the filter element 12, the dry inert gas stream from source 30 flows through desiccant chamber 36, flow meter 34 and through the bifurcated arm 38 of the supply conduit 40. Preferably, as mentioned previously, the purge gas will be preheated to below 250°C prior to contact thereof with filter element 12, thereby to quickly remove whatever water may have been collected on the filter element 12 and to aid in the volatilization of the sulfuric acid therefrom. By maintaining the temperature of the purge gas stream and filter element 12 below about 250°C and preferably between about 40°C and 200°C, there is minimized or avoided entirely accidental volatilization of commonly encountered sulfur bearing coadulterants such as ammonium sulfate and cuprous sulfate.

The dry purge gas stream entrains the volatilized sulfuric acid and conveys it to burner block 48 of FPD 50 through conduit 44. The termination of the sulfuric acid analysis cycle is signalled by return of the strip chart recorder 52 to the baseline FPD signal, indicating that substantially all sulfuric acid has been volatilized from the filter element 12 and conducted through FPD 50. Accordingly, the concentration of sulfuric acid can then be determined by mathematically relating the concentration of sulfur analyzed by the FPD to the volume of sample gas filtered through element 12 during the collection phase of the cycle. Employing the apparatus and method of the invention we have been able to analyze for sulfuric acid in the amount of as little as 0.1 microgram.

Upon completion of the analysis cycle described above, a new collection and analysis cycle is established merely by repositioning the slide shutter plate to its first position. Thus, the freshly purged portion of the filter element 12 circumscribed by shutter plate aperture 76 is returned to its station under gas sample inlet 64 of intake plate 70 whilst the portion of filter element 12 which was positioned under the sampling station during the analysis cycle just described is shunted to the corresponding purge gas station under purge gas inlet aperture 62 of plate 70. Thus, while the method of the invention involves two separate and distinct phases, a collection phase and an analysis phase, by means of the preferred filter holder embodiment depicted in FIG. 2 and disclosed hereinabove, there can be achieved substantially continuous analysis of a sample gas since, while one collected sample is being analyzed, another is being collected.

Further, we have additionally discovered that the vaporization rate of the collected sulfuric acid sample from porous filter element 12 can often be markedly enhanced when the dry gas purge stream comprises a small but effective quantity of a volatile inert wetting agent which can compete successfully with the collected sulfuric acid on the filter. It has been discovered, for instance, that alcohols in general and, in particular, the lower $C_1$-$C_6$ primary alcohols such as methanol or ethanol are efficient inert wetting agents in the practice of the invention and can serve to markedly increase the rate of volatilization of the sulfuric acid from the filter element 12 by the dry purge gas stream in liquid or vapor form and, as mentioned above, in a small but effective amount sufficient to provide a discernible increase in the rate at which volatilization of the sulfuric acid is achieved. We have discovered, for instance, that the presence of 200 p.p.m. of methanol in the purge gas stream can result in a marked increase in the rate of sulfuric acid volatilization from said filter element 12. The use of the aforedescribed wetting agents serves the practical effects of more complete vaporization of the collected sulfuric acid aerosol and of reduction in the cycle time of the purge phase of the analytical cycle. However, it should be borne in mind that, when employed, the amount of wetting agent injected into the purge gas stream should be controlled so as to avoid overloading the FPD with excessive quantities of vaporized sulfuric acid.

While the above description has been restricted to the use of the preferred filter holder 10, employing at least two purge gas stations and one sample gas station, it is obvious that the present invention can also be carried out employing only a single station through which both the sample gas and purge gas can be cyclically fed. Where a one-station filter holder is employed, however, the essentially continuous sampling and analysis achieved in the use of the preferred filter holder will be sacrificed with the principal benefit residing in at least some reduction in complexity.

Accordingly, while there are above described a number of specific embodiments of the present invention, it is obviously possible to produce other embodiments and various equivalent modifications thereof without departing from the said invention's essential spirit and intended scope.

Therefore, having set forth the general nature and several preferred embodiments of the invention, the true scope thereof is now particularly pointed out in the appended claims.

What is claimed is:

1. A method for determining the sulfuric acid aerosol content of a sample gas which comprises, seriatim:

A. conducting a known quantity of a sample gas through a porous filter medium adapted to collect sulfuric acid aerosol from said sample gas while allowing gaseous components there to pass therethrough;

B. volatilizing said collected sulfuric acid aerosol by passing a dry inert purge gas stream having a water content of less than about 1,000 parts per million and a temperature of less than about 250°C through said porous filter medium; and C. quantitatively analyzing the sulfuric acid-containing purge gas resulting from (B) for sulfur by flame photometric analysis thereof.

2. The method of claim 1 wherein said dry inert purge gas is heated to a temperature of between about 40°C and about 200°C prior to contact thereof with said porous filter medium.

3. The method of claim 1 wherein the gas stream formed in (B) is heated to and maintained at above the condensation temperature of the sulfuric acid vapors contained therein.

4. The method of claim 1 wherein the relative humidity of said sample gas stream is reduced to below 100 percent by heating to below about 110°C prior to contact thereof with said porous filter medium.

5. The method of claim 4 wherein said sample gas is heated by mixing thereof with heated dry inert purge gas.

6. The method of claim 1 wherein said sample gas is ambient air.

7. The method of claim 1 wherein said dry inert purge gas is air essentially free of sulfurous contaminants.

8. The method of claim 1 wherein said dry inert purge gas comprises a minor but effective amount of an inert wetting agent having a wetting affinity for the porous filter medium greater than that of sulfuric acid aerosol.

9. The method of claim 8 wherein said wetting agent is a $C_1$ to $C_6$ primary alcohol.

10. The method of claim 9 wherein said wetting agent is chosen from the group consisting of methanol, ethanol and mixtures thereof.

11. The method of claim 1 wherein said dry inert purge gas has a water content of less than about 10 parts per million.

12. Apparatus for determining the sulfuric acid aerosol content of a sample gas which comprises:

A. a filter holder adapted (i) to hold a porous filter medium therein and (ii) to convey an exposed portion of filter medium held therein between a first sampling station and at least one other station defining a filter purging station;

B. a porous filter medium held in said filter holder and adapted to collect sulfuric acid aerosol from a sample gas stream passing therethrough;

C. means to convey a known quantity of a sample gas to said sampling station and through said porous filter medium;

D. means to convey a purge gas through said filter medium at said filter purging station;

E. flame photometric detector means adapted to quantitatively analyze for sulfur; and F. means to convey filtered purge gas from said filter purging station into said flame photometric detector means.

13. Apparatus in accordance with claim 12 wherein (C) includes means to heat said sample gas prior to contact thereof with said filter medium.

14. Apparatus in accordance with claim 12 wherein (F) includes means to heat the purge gas stream flowing therethrough.

15. Apparatus in accordance with claim 12 wherein (D) includes means to heat said purge gas prior to contact thereof with said filter medium.

16. Apparatus in accordance with claim 12 wherein said flame photometric detector is fueled by hydrogen.

17. Apparatus in accordance with claim 12 wherein said flame photometric detector comprises signal processing circuitry adapted to amplify the output signal thereof.

18. Apparatus in accordance with claim 17 wherein said flame photometric detector comprises signal processing circuitry adapted to linearize the amplified signal thereof.

19. Apparatus in accordance with claim 12 comprising means to heat said purge gas of (D) and means to convey a portion of said purge gas into said means of (C), thereby to heat said sample gas.

20. Apparatus in accordance with claim 15 wherein said means to heat said purge gas is controlled by feedback circuitry associated with the output of said flame photometric detector, said circuitry being adapted to reduce heating of said purge gas as the flame photometric detector approaches an overloaded condition.

21. Apparatus in accordance with claim 12 wherein said filter holder of (A) comprises an inlet plate and an exhaust plate having interposed therebetween a two-position slidable shutter plate; said plates being urged together in gas tight relationship; said inlet and outlet plates being in fixed relationship to one another and having three coextensive apertures therethrough comprising a central aperture defining a sampling station and two lateral apertures positioned equidistantly to either side of said central aperture, each said lateral aperture defining a filter purging station; said slidable shutter plate having two apertures therethrough adapted to be coextensive with the central aperture and only one of the lateral apertures of the inlet and exhaust plates in a first position and being coextensive with the central aperture and the other of said lateral apertures of the inlet and exhaust plates in a second position; said slidable shutter plate including means to carry a porous filter medium exposed at each of the two apertures thereof and conduit means adapted to convey purge gas from each of said lateral filter purging stations of said exhaust plate to said flame photometric detector means.

22. The apparatus of claim 21 wherein said slidable shutter plate comprises: a slot therethrough located intermediate the opposed surfaces thereof, said slot traversing both apertures of said plate and defining a pathway for the carrying of a strip-form porous filter medium therein; a supply spool located at one end of said slot; a takeup spool located at the other end of said slot; said supply and takeup spools being adapted to receive and store said strip-form porous filter medium.

* * * * *